United States Patent
Oddenino

[11] Patent Number: 5,884,958
[45] Date of Patent: Mar. 23, 1999

[54] FUEL FILLER ASSEMBLY, PARTICULARLY FOR A MOTOR VEHICLE

[75] Inventor: Manrico Oddenino, Buttigliera Alta, Italy

[73] Assignee: ITW Fastex Italia S.p.A., Turin, Italy

[21] Appl. No.: 1,814

[22] Filed: Dec. 31, 1997

[30] Foreign Application Priority Data

Dec. 31, 1996 [IT] Italy ............................ TO96 A 001104

[51] Int. Cl.$^6$ .................................................. B62D 25/00
[52] U.S. Cl. .......................................................... 296/97.22
[58] Field of Search ........................................... 296/97.22

[56] References Cited

U.S. PATENT DOCUMENTS

| | | | |
|---|---|---|---|
| 4,917,404 | 4/1990 | Pasquali et al. | 296/97.22 |
| 4,917,418 | 4/1990 | Gokes | 296/97.22 |
| 5,044,678 | 9/1991 | Detweiler | 296/97.22 |
| 5,253,920 | 10/1993 | Eldridge | 296/97.22 |
| 5,437,491 | 8/1995 | Nedbal et al. | |
| 5,533,766 | 7/1996 | Färber | 296/97.22 |
| 5,658,036 | 8/1997 | Benoist | 296/97.22 |
| 5,673,958 | 10/1997 | Gramss . | |

*Primary Examiner*—Gary C. Hoge
*Attorney, Agent, or Firm*—Schwartz & Weinrieb

[57] ABSTRACT

A fuel filler assembly, particularly for a motor vehicle, having a filler tube, pipe, or body connectable to a supply pipe of a fuel tank, a cap for closing the filler tube or pipe, a casing fitted to the vehicle body and defining internally a compartment for housing the filler tube or body and the cap, and a lid hinged to one side of the casing so as to close the compartment by means of a snap-engaging bolt for locking the lid in a closed position; the filler assembly also having articulated connecting components for connecting the cap to the lid and defined by a support integral with the lid and having a hollow seat defined internally by a hemispherical surface, and by a spherical head integral with the cap and which engages inside the hollow seat so as to keep the cap connected to the lid in any open position of the lid, and to position the cap facing the inlet of the filler tube or pipe so as to close the filler tube or body when the lid is moved to the closed position.

23 Claims, 3 Drawing Sheets

FUEL FILLER ASSEMBLY, PARTICULARLY FOR A MOTOR VEHICLE

FIELD OF THE INVENTION

The present invention relates generally to fuel filler assemblies, and more particularly to a fuel filler assembly, particularly for a motor vehicle, wherein the filler and the filler cap are housed inside a compartment closed by a lid hinged to the casing and locked by means of a snap-on locking device.

BACKGROUND OF THE INVENTION

In known fuel filler assemblies fitted to currently marketed vehicles, the fuel filler and cap are housed inside a compartment which is recessed in the vehicle body and closed by a lid kept in the closed position by a spring or a snap-on device; and the cap is normally separable from the filler body pipe, or tube, and is normally screwed manually onto the filler tube or pipe and/or locked by means of a key-operated locking device.

When refueling, the cap is removed from the filler body or tube and set aside on any convenient supporting surface; and, at times, once the vehicle is refueled, the lid may inadvertently be closed with the cap fitted improperly to the filler tube or pipe, or even with no cap at all, thus resulting in extremely dangerous diffusion of fuel vapors and fuel leakage.

OBJECT OF THE INVENTION

It is an object of the present invention to provide a fuel filler assembly designed to overcome the above drawbacks of known filler assemblies, and more specifically to provide a filler assembly wherein the cap cannot be detached from the assembly when the filler assembly is opened.

SUMMARY OF THE INVENTION

According to the present invention, there is provided a fuel filler assembly, particularly for a motor vehicle, comprising a filler pipe or body connectable to a supply pipe of a tank; a cap for closing the filler pipe or body; a casing defining internally a compartment for housing the filler body and the cap; a lid for closing the compartment and hinged to one side of the casing; and snap-on locking means for locking the lid in a closed position;

characterized in that the assembly also comprises articulated connecting means for connecting the cap to the lid, and which provides for maintaining the cap connected to the lid in any open position of the lid, and for positioning the cap so as to be disposed adjacent to the filler pipe or tube when the lid is in the closed position so as to close the filler pipe or tube in a fluidtight manner.

BRIEF DESCRIPTION OF THE DRAWINGS

A preferred, non-limiting embodiment of the present invention will be described hereinafter by way of example with reference to the accompanying drawings, in which like reference characters designate like or corresponding parts throughout the several views, and wherein.

DETAILED DESCRIPTION OF THE ILLUSTRATED EMBODIMENTS

Figure 1:
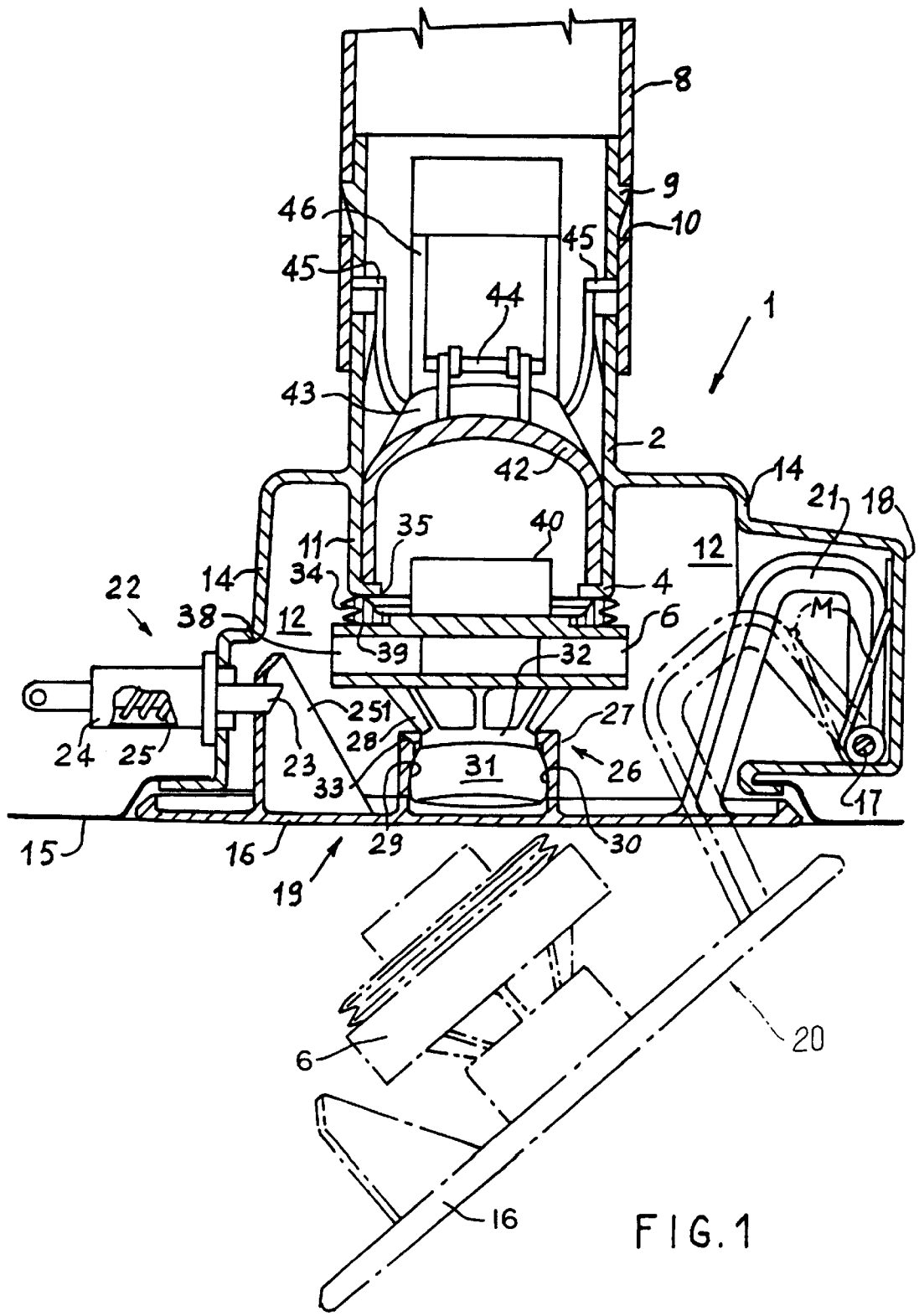
FIG. 1 is a longitudinal section from above of a filler assembly constructed in accordance with the present invention.
Figure 2:
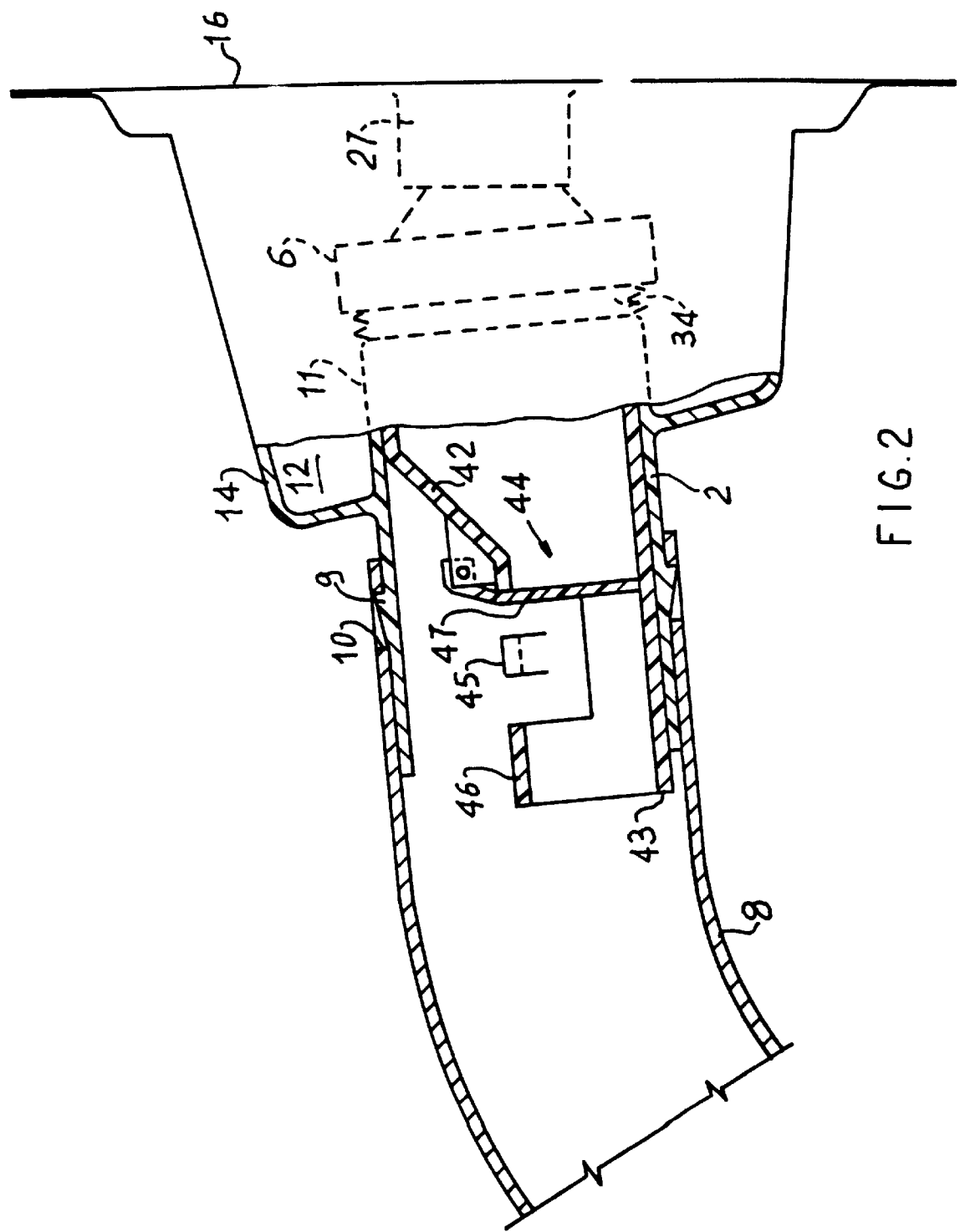
FIG. 2 is a longitudinal section of the portion connecting the filler assembly of FIG. 1 to a supply pipe of a fuel tank.

With reference to FIGS. 1 and 2, the filler assembly 1 according to the invention comprises a substantially tubular filler 2 defined at one end by a circular inlet 4 for receiving a fluidtight cap 6; at the opposite end to inlet 4, filler 2 is connected to a supply pipe 8 of a fuel tank not shown; and pipe 8 is fitted externally to and made integral with filler 2 by means of a number of peripheral teeth 9 projecting from the periphery of filler 2 and which click inside respective lock openings 10 formed in pipe 8.

At the inlet 4 end, a portion 11 of filler 2 projects inside a compartment 12 defined by a casing 14 and is so sized as to also house cap 6 when cap 6 is positioned adjacent to or abutting filer 2 thereby closing filler 2; casing 14, which is preferably made of plastic, is recessed on the inside of the vehicle body 15; and casing 14 comprises a lid 16 hinged to a pin 17 integral with a lateral wall 18 of the casing 14. Lid 16 is designed to pivot, by a maximum angle of about 90°, from a closed position 19 to an open position 20 (shown by the dot-and-dash line in FIG. 1); lid 16 is maintained in the closed position 19 by a spring M acting between wall 18 and a supporting arm 21 of lid 16; lid 16 is locked in closed position 19 by snap-engaging locking means 22 defined by a bolt 23 sliding in a respective support 24 fitted to casing 14; bolt 23 is pushed by a contrast spring 25 so as to click inside a stop tooth 251 fixed to lid 16, and is withdrawn in opposition to contrast spring 25 so as to release lid 16 by means, for example, of a cable (not shown) controlled from a remote part of the vehicle, for example, from the passenger compartment.

Filler assembly 1 according to the invention also comprises articulated connecting means 26 for connecting cap 6 to lid 16 and defined by a support 27 fixed to the inner wall of lid 16 and engaging a corresponding connecting member 28 integral with cap 6. In the preferred embodiment shown, support 27 comprises a hollow seat 29 defined internally by a hemispherical surface 30 and inside which clicks a spherical head 31 integral with cap 6 and forming part of connecting member 28. Spherical head 31 is joined to cap 6 by a base body 32, and engages hollow seat 29 with a small amount of clearance enabling cap 6 to move freely and adapt in any direction within the angular limits defined by contact of base body 32 with a circular edge 33 defining hollow seat 29.

Support 27 is so positioned on the inner face of lid 16 as to position cap 6 against inlet 4 with sufficient pressure so as to ensure fluidtight sealing when lid 16 is locked in closed position 19.

Cap 6 comprises an annular seal 34 made of elastomeric material, such as soft rubber, having a double-V radial section, and sufficiently yielding in any direction so as to ensure cap 6 adapts correctly to the mating front edge 35 of inlet 4.

Cap 6 comprises a cylindrical central stop body 38 larger than the front edge 35 of inlet 4 and having an annular seat 39 for seal 34; one side of central body 38 is joined integrally with spherical head 31 by base body 32; and the opposite side of body 38 is fitted to the body of a known valve 40 for venting the fuel vapors from the fuel tank.

When lid 16 is closed, cap 6 of filler assembly 1 according to the present invention is therefore pressed automatically against the mating edge 35 of inlet 4 so as to ensure perfect closing of filler 2, thanks to the ability of seal 34 to adapt to edge 35 of inlet 4, and the freedom of movement provided for by the spherical connection of head 31 inside hollow seat 29.

Filler 2 may be fitted inside with an auxiliary structure 42 comprising a reducing element 43 for reducing the useful section, and a retaining valve 44 for retaining the fuel vapors; auxiliary structure 42 is made integral with filler 2 by means of elastic retaining tabs 45, which click inside respective openings in filler 2; reducing element 43 (FIG. 2) comprises a tubular segment 46 tapering to a smaller diameter than that of filler 2, and is adapted for receiving a supply device (not shown) for a particular fuel, for example, unleaded petrol; retaining valve 44 comprises a flap 47 hinged to auxiliary structure 42, normally closed by a spring (not shown), and which is opened by insertion of the supply device inside filler 2; flap 47 prevents the fuel vapors from escaping when cap 6 is opened, and, when the supply device is inserted, the vapors are recovered by the supply device itself.

Figure 3:
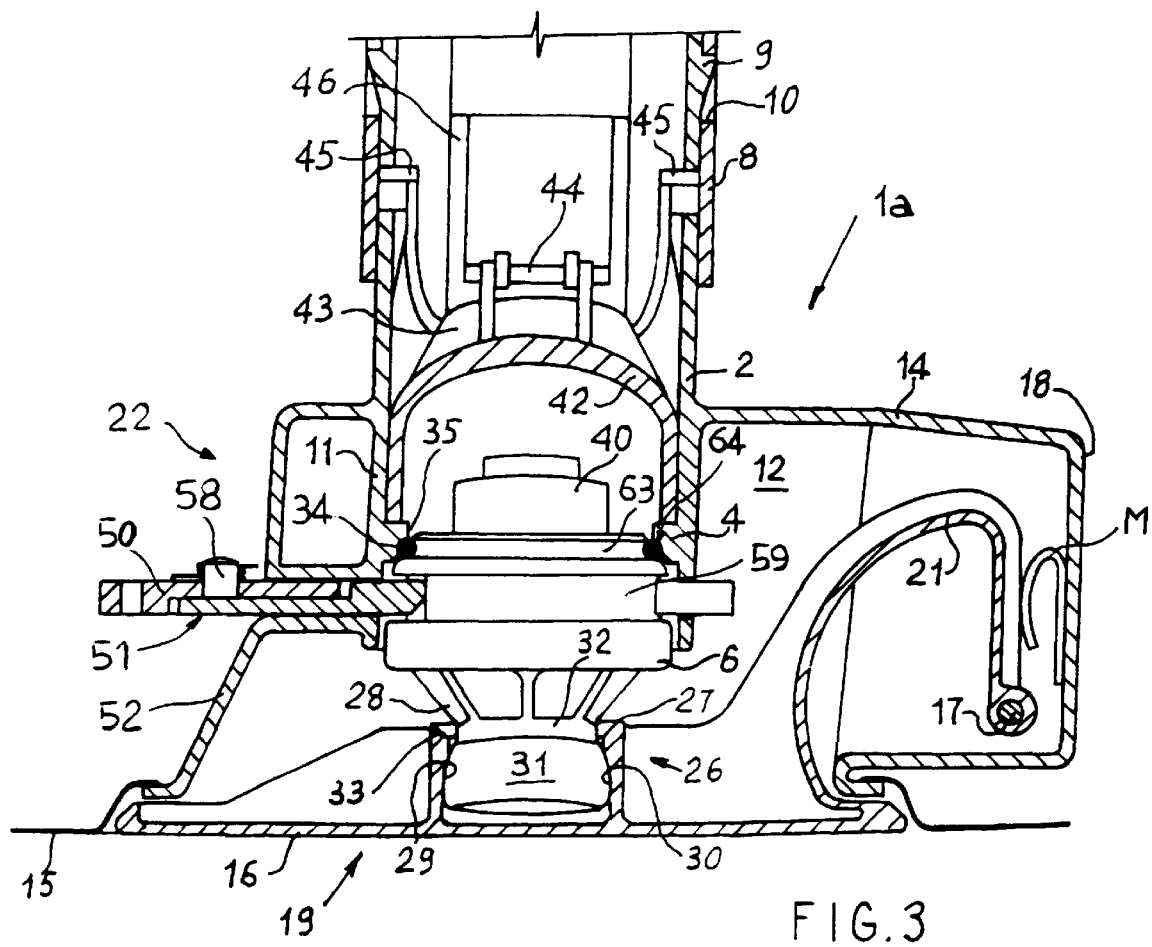
FIG. 3 is a longitudinal section from above of a variation of the filler assembly of FIG. 1.
Figure 4:
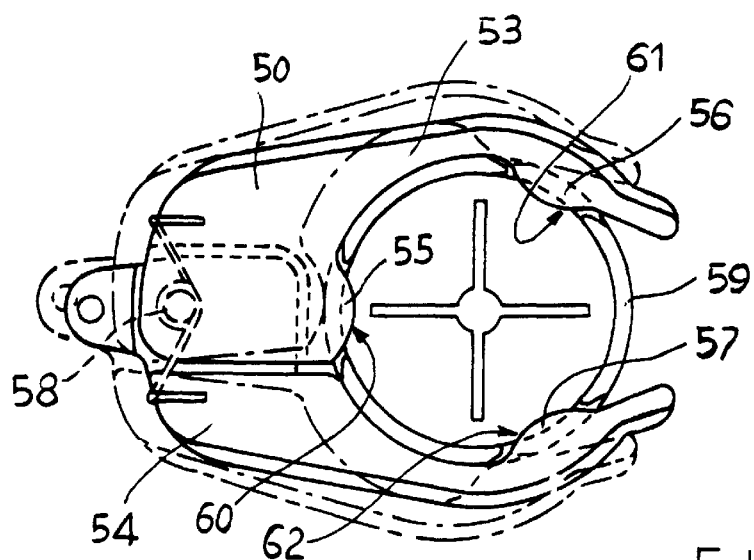
FIG. 4 is an isolated detail of the filler assembly of FIG. 3.

FIGS. 3 and 4, in which any details similar or identical to those already described are indicated using the same numbering system, show a variation 1a of the filler assembly according to the invention. Filler assembly 1a is substantially similar to assembly 1 described with reference to FIGS. 1 and 2, and differs substantially as regards the configuration of snap-engaging locking means 22 of lid 16, which in this case acts directly on cap 6 as opposed to lid 16.

In particular, locking means 22 comprises a jaw 50, which slides inside a seat 51 extending partially through a lateral wall 52 of casing 14, and is activated by a known remote device not shown.

Jaw 50 is defined by two hinged half-elements 53, 54, and comprises three rounded retaining teeth 55, 56, 57 arranged, for example, in the form of a substantially equilateral triangle.

The two hinged half-elements 53, 54 are drawn towards each other by a spring 58 located at the articulated joint between half-elements 53, 54.

Cap 6 comprises an annular groove 59 having seats 60, 61, 62 for snap-in insertion of respective retaining teeth 55, 56, 57.

As was the case with filler assembly 1, cap 6 has an annular seal 34 made of elastomeric material and having, for example, a circular radial section. Unlike the previous case, however, seal 34 is fitted to an end portion 63 of cap 6, smaller than front edge 35 of inlet 4; and front edge 35 comprises an annular seat 64 on which seal 34 rests when end portion 63 of cap 6 is inserted inside inlet 4, so that, when lid 16 is closed, cap 6 hermetically seals filler 2.

Cap 6, and consequently also lid 16 connected to it by articulated means 26, is maintained in the closed position by jaw 50 and the retaining teeth 55, 56, 57 which engage their respective seats 60, 61, 62.

When the control device (not shown) of jaw 50 is activated, jaw 50 is parted and withdrawn partly with respect to the closed position so that teeth 55, 56, 57—also by virtue of being rounded—are released from their respective seats 60, 61, 62; jaw 50 is thus moved into the position shown by the dot-and-dash line in FIG. 4, in which cap 6 is released from the jaw 50, and lid 16 is therefore opened by spring M and by the elastic reaction of seal 34 against front edge 35 of inlet 4.

Conversely, when lid 16 is closed, cap 6 is clicked between the two half-elements 53, 54 of jaw 50, which are forced open until drawn together by spring 58 about groove 59; teeth 55, 56, 57 engage their respective seats 60, 61, 62 so as to lock cap 6 and lid 16, connected to cap 6, in the closed position; and the particular (three-point) arrangement of the teeth 55, 56, 57 provides for a highly balanced, and hence safe, effective, closure even in the event of severe external stress (impact).

Spring 58 is preferably constructed such that the gripping force exerted by jaw 50 on cap 6 is greater than the force required to break the articulated connection 26 between cap 6 and lid 16. In the event of collision, therefore, even if lid 16 should accidentally open, lid 16 would be detached from the cap 6, which would remain in the closed position preventing any fuel leakage from the tank.

Snap-engaging locking means 22 may of course comprise a combination of both the devices described above, so as to act both on cap 6 and lid 16.

Clearly, changes may be made to the filler assembly as described and illustrated herein without, however, departing from the scope of the present invention as claimed hereinafter. For example, the articulated means 26 for connecting the cap 6 to the lid 16 may be defined by a single flexible elastic element connected to both the cap 6 and the lid 16. It is therefore to be understood that within the scope of the appended claims, the present invention may be practiced otherwise than as specifically described herein.

I claim:

1. A fuel filler assembly, comprising:

a fuel filler pipe having a first end adapted to be fluidically connected to a fuel tank within which fuel is to be stored, and a second end which is substantially open so as to receive fuel to be stored within the fuel tank;

a fuel filler cap for operatively covering said second end of said fuel filler pipe so as to prevent fuel from being discharged from said fuel filler pipe, and for operatively uncovering said second end of said fuel filler pipe so as to permit fuel to be dispensed into said fuel filler pipe;

a housing defining a compartment within which said second end of said fuel filler pipe and said fuel filler cap are disposed when said fuel filler cap is operatively covering said second end of said fuel filler pipe;

a fuel filler lid pivotally mounted upon said housing between a first closed position at which said fuel filler lid covers said compartment so as to prevent access to said fuel filler pipe, and a second open position at which said fuel filler lid uncovers said compartment so as to provide access to said fuel filler pipe; and single connection means defined between said fuel filler cap and said fuel filler lid for mounting said fuel filler cap upon said fuel filler lid with universal movement such that when said fuel filler lid is moved between said first closed and second open positions, said fuel filler cap, mounted upon said fuel filler lid, moves with said fuel filler lid, and when said fuel filler lid is moved to and disposed at said first closed position, said fuel filler cap can adjust its position with respect to said fuel filler lid as a result of said universal connection means such that said fuel filler can properly covers said second end of said fuel filler pipe in a substantially fluid-tight manner.

2. A fuel filler assembly as set forth in claim 1, further comprising:

means for releasably maintaining said fuel filler lid at said first closed position.

3. A fuel filler assembly as set forth in claim 2, wherein said means for releasably maintaining said fuel filler lid comprises:

a recess defined within said fuel filler lid;

a bolt movably mounted upon said housing between a first position at which a first end portion of said bolt is engaged within said recess defined within said fuel filler lid, and a second position at which said first end portion of said bolt is disengaged from said recess defined within said fuel filler lid;

a first spring operatively connected to said bolt for normally biasing said bolt toward said first position such that said first end portion of said bolt is engaged within said recess defined within said fuel filler lid; and means defining a second end portion of said bolt for operative connection to a control device whereupon activation of the control device, said bolt is moved toward said second position such that said first end portion of said bolt is disengaged from said recess defined within said fuel filler lid so as to permit said fuel filler lid to be moved to said second open position.

4. A fuel filler assembly as set forth in claim 3, further comprising:

a second spring operatively interposed between said housing and said fuel filler lid for normally biasing said fuel filler lid toward said second open position.

5. A fuel filler assembly as set forth in claim 1, wherein said single connection means for mounting said fuel filler cap upon said fuel filler lid comprises:

a socket member integrally disposed upon said fuel filler lid; and a head member integrally disposed upon said fuel filler cap and disposed within said socket member of said fuel filler lid.

6. A fuel filler assembly as set forth in claim 5, wherein:

said socket member has a substantially hemispherical concave configuration; and said head member has a substantially hemispherical convex configuration which is substantially complementary to said substantially hemispherical concave configuration of said socket member.

7. A fuel filler assembly as set forth in claim 2, wherein said means for releasably maintaining said fuel filler lid comprises:

at least one recess defined upon said fuel filler cap; and a gripping member movably mounted upon said housing between a first position at which at least one tooth member of said gripping member is engaged within said at least one recess defined upon said fuel filler cap, and a second position at which said at least one tooth member of said gripping member is disengaged from said at least one recess defined upon said fuel filler cap; and means defining a body portion, to which said gripping member is connected, for operative connection to a control device whereupon activation of the control device, said gripping member, connected to said body portion, is moved toward said second position such that said at least one tooth member of said gripping member is disengaged from said at least one recess defined upon said fuel filler cap so as to permit said fuel filler lid, upon which said fuel filler cap is fixedly mounted, to be moved to said second open position.

8. A fuel filler assembly as set forth in claim 7, wherein:

said at least one recess defined upon said fuel filler cap comprises three recesses defined upon said fuel filler cap in a substantially equiangular circumferential array;

said gripping member comprises a pair of gripping arms extending outwardly from opposite sides of said body portion; and said at least one tooth member of said gripping member comprises three teeth respectively disposed upon said body portion and each one of said gripping arms wherein said three teeth are disposed in a circumferential array corresponding to said circumferential array of said three recesses of said fuel filler cap.

9. A fuel filler assembly as set forth in claim 7, further comprising:

a spring operatively interposed between said housing and said fuel filler lid for normally biasing said fuel filler lid toward said second open position.

10. A fuel filler assembly as set forth in claim 1, wherein:

said second end of said fuel filler pipe has a predetermined diametrical extent; and said fuel filler cap has a seal member mounted thereon wherein the diametrical extent of said seal member is greater than said predetermined diametrical extent of said second end of said fuel filler pipe so as to abut said second end of said fuel filler pipe and thereby seal said second end of said fuel filler pipe in a substantially fluidtight manner when said fuel filler cap operatively covers said second end of said fuel filler pipe.

11. A fuel filler assembly as set forth in claim 1, wherein:

said second end of said fuel filler pipe has a predetermined diametrical extent;

said fuel filler pipe is provided with a seal seat at an axial position defined between said first and second ends of said fuel filler pipe; and said fuel filler cap has a seal member mounted upon a portion thereof which has a diametrical extent which is less than said predetermined diametrical extent of said second end of said fuel filler pipe so as to permit said seal member to be disposed internally within said second end of said fuel filler pipe and thereby be seated upon said seal seat of said fuel filler pipe so as to seal said second end of said fuel filler pipe in a substantially fluidtight manner when said fuel filler cap operatively covers said second end of said fuel filler pipe.

12. A fuel filler assembly for a motor vehicle, comprising:

a fuel filler pipe having a first end adapted to be fluidically connected to a motor vehicle fuel tank within which fuel is to be stored, and a second end which is substantially open so as to receive fuel to be stored within the fuel tank;

a fuel filler cap for operatively covering said second end of said fuel filler pipe so as to prevent fuel from being discharged from said fuel filler pipe, and for operatively uncovering said second end of said fuel filler pipe so as to permit fuel to be dispensed into said fuel filler pipe;

a housing defining a compartment within which said second end of said fuel filler pipe and said fuel filler cap are disposed when said fuel filler cap is operatively covering said second end of said fuel filler pipe;

a fuel filler lid pivotally mounted upon said housing between a first closed position at which said fuel filler lid covers said compartment so as to prevent access to said fuel filler pipe, and a second open position at which said fuel filler lid uncovers said compartment so as to provide access to said fuel filler pipe; and single connection means defined between said fuel filler cap and said fuel filler lid for mounting said fuel filler cap upon said fuel filler lid with universal movement such that when said fuel filler lid is moved between said first closed and second open positions, said fuel filler cap, mounted upon said fuel filler lid, moves with said fuel filler lid, and when said fuel filler lid is moved to and disposed at said first closed position, said fuel filler cap can adjust its position with respect to said fuel filler lid as a result of said universal connection means such that said fuel filler cap properly covers said second end of said fuel filler pipe in a substantially fluid-tight manner.

13. A fuel filler assembly as set forth in claim 12, wherein:
said housing is fixedly mounted upon a portion of the motor vehicle body.

14. A fuel filler assembly as set forth in claim 12, further comprising:
means for releasably maintaining said fuel filler lid at said first closed position.

15. A fuel filler assembly as set forth in claim 14, wherein said means for releasably maintaining said fuel filler lid comprises:
a recess defined within said fuel filler lid;
a bolt movably mounted upon said housing between a first position at which a first end portion of said bolt is engaged within said recess defined within said fuel filler lid, and a second position at which said first end portion of said bolt is disengaged from said recess defined within said fuel filler lid;
a first spring operatively connected to said bolt for normally biasing said bolt toward said first position such that said first end portion of said bolt is engaged within said recess defined within said fuel filler lid; and
means defining a second end portion of said bolt for operative connection to a control device whereupon activation of the control device, said bolt is moved toward said second position such that said first end portion of said bolt is disengaged from said recess defined within said fuel filler lid so as to permit said fuel filler lid to be moved to said second open position.

16. A fuel filler assembly as set forth in claim 15, further comprising:
a second spring operatively interposed between said housing and said fuel filler lid for normally biasing said fuel filler lid toward said second open position.

17. A fuel filler assembly as set forth in claim 12, wherein said single connection means for mounting said fuel filler cap upon said fuel filler lid comprises:
a socket member integrally disposed upon said fuel filler lid; and
a head member integrally disposed upon said fuel filler cap and disposed within said socket member of said fuel filler lid.

18. A fuel filler assembly as set forth in claim 17, wherein:
said socket member has a substantially hemispherical concave configuration; and
said head member has a substantially hemispherical convex configuration which is substantially complementary to said substantially hemispherical concave configuration of said socket member.

19. A fuel filler assembly as set forth in claim 14, wherein said means for releasably maintaining said fuel filler lid comprises:
at least one recess defined upon said fuel filler cap; and
a gripping member movably mounted upon said housing between a first position at which at least one tooth member of said gripping member is engaged within said at least one recess defined upon said fuel filler cap, and a second position at which said at least one tooth member of said gripping member is disengaged from said at least one recess defined upon said fuel filler cap; and means defining a body portion, to which said gripping member is connected, for operative connection to a control device whereupon activation of the control device, said gripping member, connected to said body portion, is moved toward said second position such that said at least one tooth member of said gripping member is disengaged from said at least one recess defined upon said fuel filler cap so as to permit said fuel filler lid, upon which said fuel filler cap is fixedly mounted, to be moved to said second open position.

20. A fuel filler assembly as set forth in claim 19, wherein:
said at least one recess defined upon said fuel filler cap comprises three recesses defined upon said fuel filler cap in a substantially equiangular circumferential array;
said gripping member comprises a pair of gripping arms extending outwardly from opposite sides of said body portion; and
said at least one tooth member of said gripping member comprises three teeth respectively disposed upon said body portion and each one of said gripping arms wherein said three teeth are disposed in a circumferential array corresponding to said circumferential array of said three recesses of said fuel filler cap.

21. A fuel filler assembly as set forth in claim 19, further comprising:
a spring operatively interposed between said housing and said fuel filler lid for normally biasing said fuel filler lid toward said second open position.

22. A fuel filler assembly as set forth in claim 12, wherein:
said second end of said fuel filler pipe has a predetermined diametrical extent; and
said fuel filler cap has a seal member mounted thereon wherein the diametrical extent of said seal member is greater than said predetermined diametrical extent of said second end of said fuel filler pipe so as to abut said second end of said fuel filler pipe and thereby seal said second end of said fuel filler pipe in a substantially fluidtight manner when said fuel filler cap operatively covers said second end of said fuel filler pipe.

23. A fuel filler assembly as set forth in claim 12, wherein:
said second end of said fuel filler pipe has a predetermined diametrical extent;
said fuel filler pipe is provided with a seal seat at an axial position defined between said first and second ends of said fuel filler pipe; and
said fuel filler cap has a seal member mounted upon a portion thereof which has a diametrical extent which is less than said predetermined diametrical extent of said second end of said fuel filler pipe so as to permit said seal member to be disposed internally within said second end of said fuel filler pipe and thereby be seated upon said seal seat of said fuel filler pipe so as to seal said second end of said fuel filler pipe in a substantially fluidtight manner when said fuel filler cap operatively covers said second end of said fuel filler pipe.

* * * * *